US011176741B2

(12) United States Patent
Shayani et al.

(10) Patent No.: US 11,176,741 B2
(45) Date of Patent: Nov. 16, 2021

(54) TECHNIQUES FOR GENERATING STYLIZED QUAD-MESHES FROM TRI-MESHES

(71) Applicant: AUTODESK, INC., San Rafael, CA (US)

(72) Inventors: Hooman Shayani, London (GB); Mark Thomas Davis, Mill Valley, CA (US); Andriy Banadyha, London (GB); Stephen Barley, San Rafael, CA (US)

(73) Assignee: AUTODESK, INC., San Rafael, CA (US)

( * ) Notice: Subject to any disclaimer, the term of this patent is extended or adjusted under 35 U.S.C. 154(b) by 36 days.

(21) Appl. No.: 16/536,241

(22) Filed: Aug. 8, 2019

(65) Prior Publication Data

US 2020/0051333 A1 Feb. 13, 2020

Related U.S. Application Data

(60) Provisional application No. 62/716,842, filed on Aug. 9, 2018.

(51) Int. Cl.
*G06T 17/20* (2006.01)
*G06T 19/20* (2011.01)
(Continued)

(52) U.S. Cl.
CPC ............ *G06T 17/205* (2013.01); *G06F 30/23* (2020.01); *G06T 19/20* (2013.01); *G06F 2119/18* (2020.01); *G06T 2219/2024* (2013.01)

(58) Field of Classification Search
None
See application file for complete search history.

(56) References Cited

U.S. PATENT DOCUMENTS 6,362,820 B1 * 3/2002 Hoppe ................... G06T 17/20
345/419
2004/0189633 A1 * 9/2004 Sederberg ............... G06F 30/00
345/418

(Continued)

FOREIGN PATENT DOCUMENTS

WO 95/06291 A1 3/1995

OTHER PUBLICATIONS

Crease, n.2, Oxford English Dictionary 2nd Edition, 1989, Oxford University Press, retrieved from "https://www.oed.com/oed2/00053500", Accessed Mar. 9, 2021 (Year: 1989).*

(Continued)

*Primary Examiner* — Michael J Cobb
(74) *Attorney, Agent, or Firm* — Artegis Law Group, LLP

(57) ABSTRACT

In various embodiments, a stylization subsystem automatically modifies a three-dimensional (3D) object design. In operation, the stylization subsystem generates a simplified quad mesh based on an input triangle mesh that represents the 3D object design, a preferred orientation associated with at least a portion of the input triangle mesh, and mesh complexity constraint(s). The stylization subsystem then converts the simplified quad mesh to a simplified T-spline. Subsequently, the stylization subsystem creases one or more of edges included in the simplified T-spline to generate a stylized T-spline. Notably, the stylized T-spline represents a stylized design that is more convergent with the preferred orientation(s) than the 3D object design. Advantageously, relative to prior art approaches, the stylization subsystem can more efficiently modify the 3D object design to improve overall aesthetics and manufacturability.

20 Claims, 4 Drawing Sheets

(51) Int. Cl.
  *G06F 30/23* (2020.01)
  *G06F 119/18* (2020.01)

(56) References Cited

U.S. PATENT DOCUMENTS

| | | | | |
|---|---|---|---|---|
| 2008/0162090 | A1* | 7/2008 | Perry | G06F 30/23 703/1 |
| 2012/0029882 | A1 | 2/2012 | Bommes et al. | |
| 2016/0005221 | A1* | 1/2016 | Morwald | G06T 5/005 348/222.1 |
| 2019/0155986 | A1* | 5/2019 | Schmitter | G06F 16/904 |

OTHER PUBLICATIONS

Sebastian H. Greshake and Robert Bronsart, Using Subdivision Surfaces to Address the Limitations of B-spline Surfaces in Ship Hull Form Modeling, 2016, Proceedings of PRADS 2016, pp. 1-8 (Year: 2016).*

Autodesk Fusion 360, Crease Edge in TSplines Results in Box Model?; 2013, Autodesk Forums, retrieved from "https://forums.autodesk.com/t5/fusion-360-design-validate/crease-edge-in-tsplines-results-in-box-model/td-p/4372623" (Year: 2013).*

Phil Cook, "An Introduction to SubD (Subdivision Surface Modelling) in Rhino3d v7, 2020, retrieved from https://www.rhino3d.co.uk/rhino-for-windows/an-introduction-to-subd-subdivision-surface-modelling-in-rhino3d-v7/" (Year: 2020).*

International Search Report for application No. PCT/US2019/046025 dated Oct. 1, 2019.

FATHOM—Dynamic Advanced Manufacturing: "FATHOM Step-By-step Tutorial—How to Convert a Mesh or Scan Data Into a Workable T-Spline" Jul. 19, 2016, URL: https://studiofathom.com/blog/mesh-tot-spline-in-10-steps, 5 pages.

TU Delft: "Tsplines for Rhino", URL: http://wiki.bk.tudelft.nl/toi-pedia/Tsplines_For_Rhino, Feb. 21, 2014, 6 pages.

Jakob Wenzel et al. "Interactive field-aligned mesh generator", URL:https://github.com/wjakob/instant-meshes, Retrieved on Nov. 23, 2020, 4 pages.

Digital Simulation From conceptual optimization to CAD, URL:https://www.youtube.com/watch?v=QhQmNzz0tGg, Retrieved on Nov. 23, 2020, Feb. 2, 2017, 1 page.

SolidThinking Inspire 2018 New Features: PolyNURBS Fit, URL:https://www.youtube.com/watch?v=4QFu1r7JEC0, Retrieved Nov. 23, 2020, Feb. 2, 2017, 1 page.

Junjie Cao et al., "Point Cloud Skeletons via Laplacian-Based Contraction", IEEE International Conference on Shape Modeling and Applications (SMI) 2010, 11 pages.

Andrea Tagliasacchi et al., "Mean Curvature Skeletons", Eurographics Symposium on Geometry Processing 2012, p. 10.

Marcel Campen et al., "Quantized Global Parametrization", 2015, 12 pages.

David Bommes et al., "Integer-Grid Maps for Reliable Quad Meshing", 2013, 12 pages.

David Bommes et al., "Mixed-Integer Quadrangulation", ACM Transactions on Graphics (TOG), 28(3), Article No. 77, 2009, 10 pages.

Instant Field-Aligned Meshes URL:https://igl.ethz.ch/projects/instant-meshes/, retrieved on Nov. 24, 2020, Jul. 10, 2020, 2 pages.

Jingwei Huang et al., "QuadriFlow: A Scalable and Robust Method for Quadrangulation", Eurographics Symposium on Geometry Processing 2018, 14 pages.

* cited by examiner

TECHNIQUES FOR GENERATING STYLIZED QUAD-MESHES FROM TRI-MESHES

CROSS-REFERENCE TO RELATED APPLICATIONS

This application claims the priority benefit of the United States Provisional Patent Application titled, "TECHNIQUES FOR STYLIZING AND IMPROVING MANUFACTURABILTY OF THREE-DIMENSIONAL SHAPES," filed on Aug. 9, 2018 and having Ser. No. 62/716,842. The subject matter of this related application is hereby incorporated herein by reference.

BACKGROUND

Field of the Various Embodiments

Embodiments relate generally to computer-aided design and computer-aided design software and, more specifically, to techniques for generating stylized quad meshes from tri-meshes.

Description of the Related Art

Generative design for three-dimensional ("3D") objects is a computer-aided design ("CAD") process that automatically synthesizes designs for 3D objects that satisfy any number and type of high-level goals and design constraints. In a typical generative design flow, a user specifies functional goals and design constraints, and a generative design application then executes a variety of multi-objective optimization algorithms to optimize potential solutions based on the functional goals and design constraints. This type of design process is an evolutionary process that can generate a vast number (e.g., thousands) of complex geometrical designs that satisfy the functional goals and design constraints. The generative design application presents those designs to the user in the context of a design space. The user can subsequently explore the design space, manually viewing and evaluating the different designs and selecting one or more designs for additional design and/or manufacturing activities.

One drawback of using a generative design process is that the resulting designs do not usually reflect non-functional preferences. In particular, the resulting designs oftentimes have "organic" shapes, meaning that the resulting designs can have lumpy shapes that reflect the optimal way various forces can impact the shapes of the 3D objects making up the resulting designs. In essence, the performance of an organic shape is optimized by the generative design process with respect to a set of functional goals and design constraints, but the overall appearance of the organic shape is not taken into account. Because of the prevalence of organic shapes in a typical generative design space, oftentimes none of the designs generated via a generative design process are aesthetically acceptable to the designer. Further, even if a particular design generated via a generative design process is aesthetically acceptable to the designer, manufacturing the organic shapes included in the design can be inefficient. For example, to reproduce the lumps that characterize an organic shape, a Computer Numerical Control ("CNC") milling machine may have to move along several different tool paths while performing many time-consuming grinding operations.

Compounding the above drawback is the fact that modifying a given design selected from a generative design space to reflect non-functional, aesthetic preferences usually involves manual processes that can be tedious and prohibitively time-consuming. Consequently, if the time allocated for design activities is limited, then a designer may decide not to make certain modifications to a selected design in the interest of time. In such cases, the overall quality of the design can suffer, and manufacturing time can be increased. For example, if a designer were to smooth out fewer organic shapes included in a selected design in order to save time, then the manufacturability of the design could be suboptimal, thereby resulting in a more time-consuming and costly back-end manufacturing process.

As the foregoing illustrates, what is needed in the art are more effective techniques for modifying 3D object designs, such as those produced through generative design processes, to reflect non-functional preferences.

SUMMARY

One embodiment sets forth a computer-implemented method for automatically modifying a design of a three-dimensional (3D) object. The method includes generating a simplified quad mesh based on an input triangle mesh that represents the 3D object design, a preferred orientation associated with at least a portion of the input triangle mesh, and at least one mesh complexity constraint; performing one or more operations to convert the simplified quad mesh to a simplified T-spline; and performing one or more operations to crease one or more edges included in the simplified T-spline to generate a stylized T-spline, where the stylized T-spline represents a stylized design that is more convergent with the preferred orientation than the 3D object design.

At least one technical advantage of the disclosed techniques relative to the prior art is that, with the disclosed techniques, a design of a three-dimensional (3D) object can be modified more efficiently to improve overall aesthetics and manufacturability. In particular, with the disclosed techniques, the types of surfaces and edges in a design that includes organic shapes can be modified automatically to produce a resulting design that has fewer lumpy shapes and shapes that are better aligned with preferred orientations(s). Accordingly, the time and effort required to improve the aesthetics and manufacturability of a given 3D object design can be substantially reduced relative to more manual prior art approaches. Further, because 3D object designs can be automatically modified with the disclosed techniques, a greater number of modifications to 3D object designs can be made within allotted budgets for design activities, thereby increasing the overall aesthetic quality and manufacturability of those designs. These technical advantages provide one or more technological advancements over prior art approaches.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

In the following description, numerous specific details are set forth to provide a more thorough understanding of the various embodiments. However, it will be apparent to one skilled in the art that the inventive concepts may be practiced without one or more of these specific details.

System Overview

Figure 1:
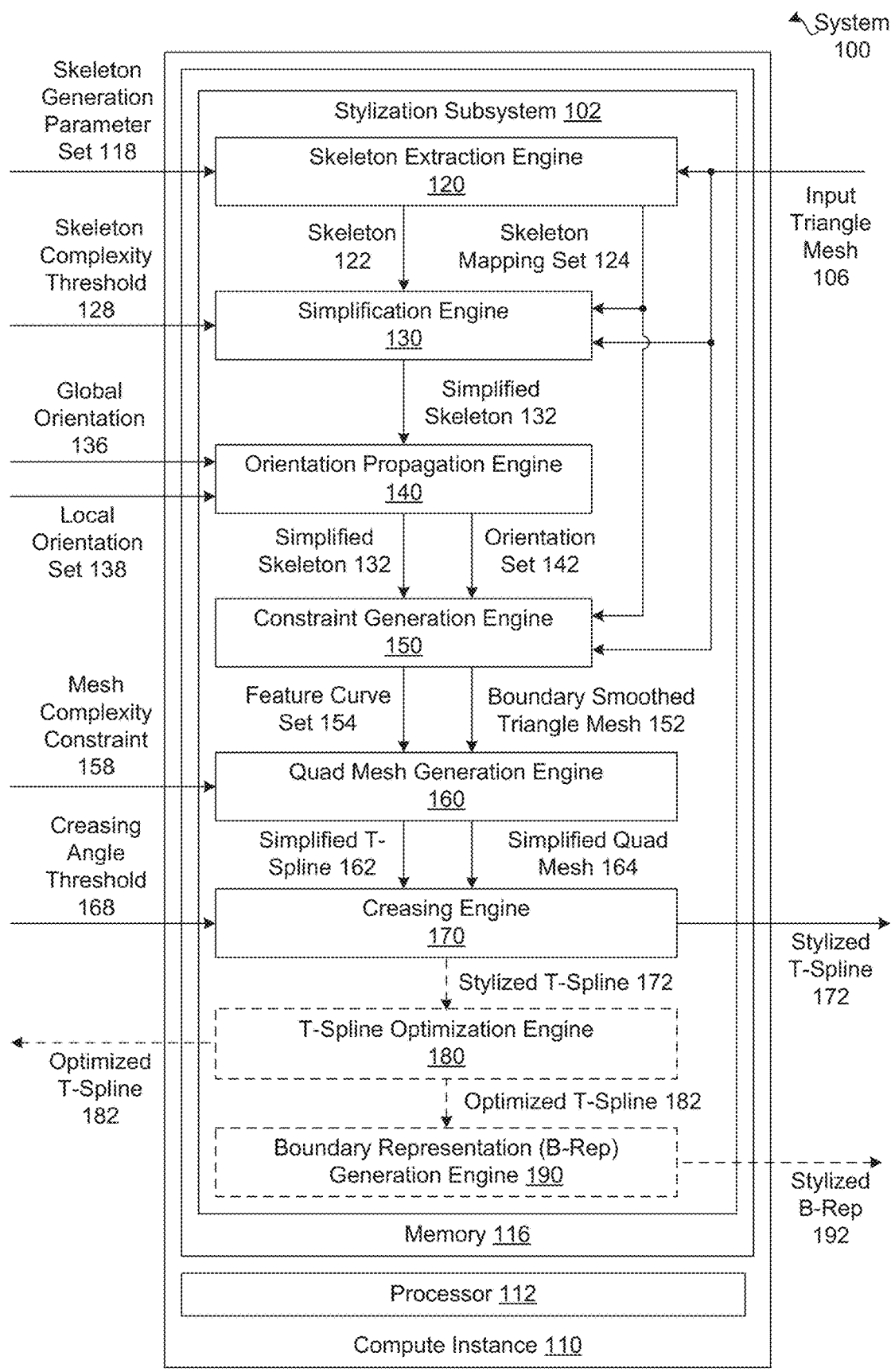
FIG. 1 is a conceptual illustration of a system configured to implement one or more aspects of the various embodiments.

FIG. 1 is a conceptual illustration of a system 100 configured to implement one or more aspects of the various embodiments. The system 100 includes, without limitation, a compute instance 110. For explanatory purposes, multiple instances of like objects are denoted with reference numbers identifying the object and parenthetical numbers identifying the instance where needed. In alternate embodiments, the system 100 may include any number of compute instances 110. Any number of the components of the system 100 may be distributed across multiple geographic locations or implemented in one or more cloud computing environments (i.e., encapsulated shared resources, software, data, etc.) in any combination.

As shown, the compute instance 110 includes, without limitation, a processor 112 and a memory 116. The processor 112 may be any instruction execution system, apparatus, or device capable of executing instructions. For example, the processor 112 could comprise a central processing unit ("CPU"), a graphics processing unit ("GPU"), a controller, a micro-controller, a state machine, or any combination thereof. The memory 116 stores content, such as software applications and data, for use by the processor 112 of the compute instance 110. In alternate embodiments, each of the compute instances 110 may include any number of processors 112 and any number of memories 116 in any combination. In particular, any number of the compute instances 110 (including one) may provide a multiprocessing environment in any technically feasible fashion.

The memory 116 may be one or more of a readily available memory, such as random access memory ("RAM"), read only memory ("ROM"), floppy disk, hard disk, or any other form of digital storage, local or remote. In some embodiments, a storage (not shown) may supplement or replace the memory 116. The storage may include any number and type of external memories that are accessible to the processor 112. For example, and without limitation, the storage may include a Secure Digital Card, an external Flash memory, a portable compact disc read-only memory (CD-ROM), an optical storage device, a magnetic storage device, or any suitable combination of the foregoing.

The compute instance 110 is configured to implement one or more applications or subsystems of applications. For explanatory purposes only, each application is depicted as residing in the memory 116 of a single compute instance 110 and executing on a processor 112 of the single compute instance 110. However, as persons skilled in the art will recognize, the functionality of each application may be distributed across any number of other applications that reside in the memories 116 of any number of compute instances 110 and execute on the processors 112 of any number of compute instances 110 in any combination. Further, the functionality of any number of applications or subsystems may be consolidated into a single application or subsystem.

In particular, the compute instance 110 is configured to automatically modify 3D object designs to reflect non-functional preferences, such as aesthetic preferences and preferences related to manufacturability. As referred to herein, a "3D object design" is a design of a 3D object. A 3D object may be any type of object and, in a hierarchical fashion, may include any number of other 3D objects. Oftentimes, numerous 3D objects are automatically generated based on a single 3D object design using automated manufacturing tools/equipment. Further, a 3D object design can be represented using any number of different formats/models.

For example, a 3D object design can be represented as a polygon mesh that specifies the surface of the 3D object using vertices, edges, and faces. Each vertex is a point in 3D space, two vertices connected by a straight line define an edge, three vertices interconnected via three edges define a triangle, four vertices interconnected via four edges define a quadrilateral ("quad"), etc. In general, a group of polygons that are connected together by shared vertices is referred to as a polygon mesh. More specifically, a group of triangles that are interconnected via shared vertices is referred to as a triangle mesh and each triangle represents a different face of the associated 3D object. A triangle mesh is also commonly referred to as a "tri-mesh." Similarly, a group of quads that are interconnected via shared vertices is referred to as a quad mesh and each quad represents a different face of the associated 3D object.

In another example, a 3D object design can be represented as a T-spline that specifies the surface of the 3D object as multiple smaller surfaces that are formed into smooth elements. Oftentimes, a T-spline can be viewed and manipulated via CAD tools as either a smooth surface or a boxy mesh. In yet another example, a 3D object design can be represented as a boundary representation ("B-Rep"). A B-Rep specifies the 3D object as a solid that is bounded by an associated surface and has an interior and an exterior. A B-Rep specifies both topology (e.g., faces, edges, and vertices) and geometry (e.g., surfaces, curves, and points). For explanatory purposes only, a "design" refers to a 3D object design.

Because many techniques (e.g., generative design algorithms, topology optimization algorithms, etc.) for automatically generating 3D object designs do not typically take into account non-functional preferences, there is often a need to modify an automatically generated 3D object design that does not satisfy non-functional requirements. For example, a typical generative design application produces a design space that includes a vast number (e.g., thousands) of complex geometrical designs that satisfy any number of specified functional goals and design constraints. One drawback of using a generative design application is that the resulting designs oftentimes have organic shapes that are aesthetically unappealing or expensive/difficult to manufacture. Because of the prevalence of organic shapes in a typical generative design space, oftentimes none of the designs generated via a generative design application are aesthetically acceptable to the designer.

Compounding the above drawback is the fact that modifying a given design selected from a generative design space to reflect non-functional, aesthetic preferences usually involves manual processes that can be tedious and prohibitively time-consuming. Consequently, if the time allocated for design activities is limited, then a designer may decide not to make certain modifications to a selected design in the interest of time. In such cases, the overall quality of the design can suffer, and manufacturing time can be increased.

Modifying 3D Object Designs to Reflect Non-Functional Preferences

To address the above problems, the compute instance 110 implements a stylization subsystem 102 that automatically modifies an input design represented by an input triangle mesh 106 to reflect non-functional preferences. The stylization subsystem 102 resides in the memory 116 of the compute instance 110 and executes on the processor 112 of the compute instance 110. As shown, the stylization subsystem 102 includes, without limitation, a skeleton extraction engine 120, a simplification engine 130, an orientation propagation engine 140, a constraint generation engine 150, a quad mesh generation engine 160, and a creasing engine 170. As depicted with dashed boxes and arrows, in alternate embodiments, the stylization subsystem 102 may also include a T-spline optimization engine 180 and/or a boundary representation (B-Rep) generation engine 190.

In alternate embodiments, the functionality of the skeleton extraction engine 120, the simplification engine 130, the orientation propagation engine 140, the constraint generation engine 150, the quad mesh generation engine 160, and the creasing engine 170 as described herein may be implemented in any number of software applications in any combination. Each of the software applications may reside in any number of memories 116 and execute on any number of processors 112, in any number of locations and any combination. Further, in various embodiments, any number of the components of the stylization subsystem 102 and/or any of the techniques disclosed herein may be implemented while other components and/or techniques may be omitted.

The stylization subsystem 102 may acquire the input triangle mesh 106 from any source and in any technically feasible fashion. For instance, in some embodiments, the stylization subsystem 102 acquires the input triangle mesh 106 based on input received from a user via a graphical user interface ("GUI"). For example, the user could select a triangle mesh representation of one of the designs generated by a generative design application as the input triangle mesh 106. In another example, the stylization subsystem 102 could acquire the input triangle mesh 106 from another software application via an application programming interface ("API").

As shown, the skeleton extraction engine 120 generates a skeleton 122 and a skeleton mapping set 124 based on the input triangle mesh 106 and a skeleton generation parameter set 118. The skeleton 122 represents the global shape and topology of the input triangle mesh 106 and includes, without limitation, any number of nodes (not shown in FIG. 1) and any number of edges (not shown in FIG. 1). Each of the nodes is a different point in 3D space and each edge connects two nodes. The skeleton mapping set 124 includes, without limitation, any number of mappings (not shown) between the skeleton 122 and the input triangle mesh 106. More precisely, for each node and each edge in the skeleton 122, a corresponding mapping in the skeleton mapping set 124 specifies one or more associated vertices in the input triangle mesh 106.

The skeleton generation parameter set 118 specifies values for any number of parameters that control how the skeleton extraction engine 120 generates the skeleton 122 and/or the quality of the skeleton 122. For instance, in some embodiments, the skeleton generation parameter set 118 specifies values for a skeleton complexity parameter that controls the complexity (e.g., number of nodes and/or edges) of the skeleton 122. The skeleton extraction engine 120 may generate the skeleton 122 and the skeleton mapping set 124 in any technically feasible fashion.

For instance, in some embodiments, the skeleton extraction engine 120 shrinks the input triangle mesh 106 to generate a shrunken mesh. The skeleton extraction engine 120 then merges groups of vertices in the shrunken mesh as per the skeleton complexity parameter value to generate the skeleton 122. For each node in the skeleton 122, the skeleton extraction engine 120 generates a mapping between the node and the group of vertices from which the node was generated and then adds the mapping to the skeleton mapping set 124. For each edge in the skeleton 122, the skeleton extraction engine 120 generates a mapping between the edge and the union of the two groups of vertices associated with the two nodes connected via the edge and then adds the mapping to the skeleton mapping set 124.

The skeleton extraction engine 120 may acquire the skeleton generation parameter set 118 in any technically feasible fashion. For instance, in some embodiments, the skeleton extraction engine 120 generates the skeleton generation parameter set 118 based on input received from a user via a GUI or an API. In alternate embodiments, the skeleton generation parameter set 118 is omitted and the skeleton extraction engine 120 operates in a default fashion. In the same or other alternate embodiments, the skeleton extraction engine 120 does not generate the skeleton mapping set 124. Instead, the stylization subsystem 102 may include a skeleton mapping engine that generates the skeleton mapping set 124 based on the skeleton 122 and the input triangle mesh 106.

As shown, the simplification engine 130 generates the simplified skeleton 132 based on the input triangle mesh 106, the skeleton 122, the skeleton mapping set 124, and a skeleton complexity threshold 128. In general, the simplification engine 130 segments the edges of the skeleton 122 and then removes redundant nodes and edges as per the skeleton complexity threshold 128 to generate the simplified skeleton 132. Accordingly, the simplified skeleton 132 is a simplified version of the skeleton 122.

More precisely, the simplification engine 130 simplifies the skeleton 122 based on the local curvature of the skeleton 122 and the rate of change in the cross-section of the input triangle mesh 106 along each path between any two nodes in the skeleton 122 having degrees higher than two. As referred to herein, the local curvature of the skeleton 122 along a path of the skeleton 122 is the derivative of the direction vector of the edges of the skeleton 122 with respect to the position along the path.

To determine the rates of changes in the cross-sections of the input triangle mesh 106, the simplification engine 130 obtains the cross-section of the input triangle mesh 106 with planes which pass through the nodes in the skeleton 122 having degrees of two. The simplification engine 130 uses the skeleton mapping set 124 to avoid generating cross-sections for portions of the input triangle mesh 106 that do not correspond with the nodes in the skeleton 122. Subsequently, the simplification engine 130 performs comparison operations between the cross-sections in each series of cross-sections. Each series of cross-sections is along a different path between two nodes of the skeleton having degrees higher than two. The simplification engine 130 may perform any number and type of comparison operations using any type of distance metric. For instance, in some embodiments, the simplification engine 130 may align cross-sections with one another and then compute distance metric values based on the area difference between the cross-sections.

The simplification engine 130 then segments each path between two nodes of the skeleton 122 having degrees higher than two using a segmentation metric that is based on the rates of change of consecutive cross-sections and the local curvature of the skeleton 122 at each node. The simplification engine 130 may implement any type of segmentation metric and use any segmentation algorithm and/or clustering algorithm to segment each path based on the segmentation metric values. For instance, in some embodiments, the simplification engine 130 computes the segmentation metric value for each node of the skeleton 122 and then compares the segmentation metric values to the skeleton complexity threshold 128. The simplification engine 130 designates the nodes having segmentation metric values greater than the skeleton complexity threshold 128 as boundaries between the segments and the remaining nodes (which are inside segments) as redundant nodes. The simplification engine 130 then removes the redundant nodes from the skeleton 122 to generate the simplified skeleton 132.

The simplification engine 130 may acquire the skeleton complexity threshold 128 in any technically feasible fashion. For instance, in some embodiments, the simplification engine 130 determines the skeleton complexity threshold 128 based on input received from a user via a GUI or an API. In other embodiments, the simplification engine 130 sets the skeleton complexity threshold 128 equal to a parameter included in the skeleton generation parameter set 118. In alternate embodiments, the simplification engine 130 does not acquire the skeleton complexity threshold 128 and the simplification engine 130 operates in a default fashion. In other alternate embodiments, the simplification engine 130 may acquire any number and type of parameters that customize the segmentation/simplification process in any technically feasible fashion.

The orientation propagation engine 140 propagates a global orientation 136 and a local orientation set 138 to each node of the simplified skeleton 132 having a degree of one or two to generate an orientation set 142. The global orientation 136 is a 3D vector that specifies a preferred orientation for quad faces. In some embodiments, the global orientation 136 may be associated with a manufacturing process or machining process. For example, the global orientation 136 could be a pooling direction that is associated with a molding manufacturing process or a machining direction that is associated with a three-axis subtractive manufacturing process.

The local orientation set 138 includes, without limitation, any number (including zero) of local orientation specifications. Each local orientation specification specifies a local orientation and an associated subset of the nodes in the simplified skeleton 132. The local orientation is a 3D vector that specifies a preferred orientation for quad faces that correspond to the associated subset of the nodes. Accordingly, each local orientation specification is associated with a different portion of the simplified skeleton 132 and therefore a different portion of the initial design. The global orientation 136 and the local orientations included in the local orientation set 138 are also referred to herein as "preferred orientations." Note that the orientation propagation engine 140 disregards the global orientation 136 for the nodes that have local orientations specified in the local orientation set 138.

The orientation propagation engine 140 may acquire the global orientation 136 and the local orientation set 138 in any technically feasible fashion. For instance, in some embodiments, the orientation propagation engine 140 determines the global orientation 136 and/or the local orientation set 138 based on input received from a user via a GUI or an API. In various embodiments, either one or both of the global orientation 136 and the local orientation set 138 may be omitted and the orientation propagation engine 140 operates in a default manner regarding the omitted preferred orientation(s).

The orientation set 142 includes, without limitation, a different local coordinate system (not shown in FIG. 1) for each node in the simplified skeleton 132 having a degree of one or two. In alternate embodiments, the orientation set 142 may specify the local coordinate systems for the nodes in the simplified skeleton 132 having degrees of one or two in any technically feasible fashion. The orientation propagation engine 140 determines the local coordinate systems based on the global orientation 136, the local orientation set 138, and the orientation and topology of the simplified skeleton 132. Notably, the orientation propagation engine 140 aligns the local coordinate systems with each other and with the associated preferred orientations. The orientation propagation engine 140 is described in greater detail in conjunction with FIG. 3.

As shown, the constraint generation engine 150 generates a feature curve set 154 and a boundary smoothed triangle mesh 152 based on the orientation set 142, the skeleton mapping set 124, and the input triangle mesh 106. Upon receiving the orientation set 142, the constraint generation engine 150 applies any number and type of mesh smoothing algorithms to the input triangle mesh 106 to generate a smoothed triangle mesh (not shown). For each triangle in the smoothed triangle mesh, the constraint generation engine 150 determines the "feature" angle between the normal vector of the triangle and the local coordinate system associated with the triangle as per the skeleton mapping set 124 and the orientation set 142.

More precisely, the constraint generation engine 150 uses the skeleton mapping set 124 to identify the nodes of the simplified skeleton 132 that are associated with the triangle. The constraint generation engine 150 then sets the feature angle equal to the direction of the surface normal of the triangle in the local coordinate system for the identified nodes (specified in the orientation set 142). Note that if the local orientation set 138 is not specified, then the constraint generation engine 150 uses a global coordinate system defined by the global orientation 136 to compute the feature angles for all of the triangles.

Subsequently, the constraint generation engine 150 partitions the triangles in the smoothed triangle mesh into triangle groups based on the feature angles. The constraint generation engine 150 may partition the triangles in any technically feasible fashion. For instance, in some embodiments, the constraint generation engine 150 may partition the triangles using a machine learning model trained on data representing a preferred style with respect to feature angles and triangle groups. In other embodiments, the constraint generation engine 150 may partition the triangles based on a rule, a heuristic, or a function associated with a style specified by the user via a GUI or an API. For example, the constraint generation engine 150 could assign the triangles associated with feature angles ranging from −90 degrees to −45 degrees to a first triangle group, the triangles associated with feature angles ranging from −45 degrees to +45 degrees to a second triangle group, and the triangles associated with feature angles ranging from +45 degrees to +90 degrees to a third triangle group.

The constraint generation engine 150 then uses any number and type of mesh boundary smoothing techniques to smooth the boundaries between the triangle groups of the smoothed triangle mesh and generate the boundary smoothed triangle mesh 152. Note that in some embodiments, the smoothing process may involve local remeshing of one or more of the triangles at the boundaries. As persons skilled in the art will recognize, each of the smoothed boundaries is a sequence of triangle edges. The constraint generation engine 150 adds each of the smoothed boundaries to the feature curve set 154 as a different feature curve (not shown). Accordingly, the feature curve set 154 includes, without limitation, any number of feature curves, where each feature curve is a sequence of triangle edges in the boundary smoothed triangle mesh 152. Importantly, the feature curve set 154 along with the underlying boundary smoothed triangle mesh 152 represents orientation preferences and, optionally, a preferred style.

The quad mesh generation engine 160 implements any number and type of quad mesh generation algorithms to generate a simplified quad mesh 164 based on the feature curve set 154, the boundary smoothed triangle mesh 152, and a mesh complexity constraint 158. The feature curve set 154 constrains the orientation of the quad faces generated by the quad mesh generation engine 160. The mesh complexity constraint 158 constrains the complexity (e.g., the number of faces, edges, and/or vertices) of the simplified quad mesh 164. The mesh complexity constraint 158 may configure the quad mesh generation engine 160 to control the complexity of the simplified quad mesh 164 in any technically feasible fashion. For instance, in some embodiments, the mesh complexity constraint 158 specifies a maximum number of quad faces that the simplified quad mesh 164 can have. The quad mesh generation engine 160 may acquire the mesh complexity constraint 158 in any technically feasible fashion. For instance, in some embodiments, the quad mesh generation engine 160 determines the mesh complexity constraint 158 based on input received from a user via a GUI or an API.

Advantageously, the simplified quad mesh 164 has the same topology as and approximates the input triangle mesh 106, but better reflects non-functional preferences. Significantly, the complexity of the simplified quad mesh 164 is limited by the mesh complexity constraint 158 and the quad faces of the simplified quad mesh 164 are aligned with the preferred orientations. Typically, if the input triangle mesh 106 represents an input design that has organic shapes, then the simplified quad mesh 164 represents a simplified design that has smoother surfaces and improved aesthetics with respect to the preferred orientations. Further, the time that would be required to manufacture an object based on the simplified design can be less than the time that would be required to manufacture an object based on the input design.

To facilitate subsequent design, optimization, and/or manufacturing operations, the quad mesh generation engine 160 generates a simplified T-spline 162 based on the simplified quad mesh 164. The quad mesh generation engine 160 may convert the simplified quad mesh 164 to the simplified T-spline 162 in any technically feasible fashion. The simplified T-spline 162 has the same topology as and approximates the input triangle mesh 106, but better reflects non-functional preferences. In alternate embodiments, the quad mesh generation engine 160 may also fit the simplified T-spline 162 with the input triangle mesh 106. In other embodiments, the quad mesh generation engine 160 does not generate the simplified T-spline 162. Instead, the stylization subsystem 102 includes a T-spline generation engine that generates the simplified T-spline 162 based on the simplified quad mesh 164 and then optionally fits the simplified T-spline 162 with the input triangle mesh 106.

Note that the techniques described herein are illustrative rather than restrictive, and may be altered without departing from the broader spirit and scope of the embodiments. Many modifications and variations will be apparent to those of ordinary skill in the art without departing from the scope and spirit of the described embodiments and techniques. Further, in various embodiments, any number of the techniques disclosed herein may be implemented while other techniques may be omitted in any technically feasible fashion.

In particular and for explanatory purposes only, the functionality of the stylization subsystem 102 is described in the context of at least one quad mesh generation algorithm that is configured via the feature curve set 154. However, any combination of techniques that generate a quad mesh having the same topology as and approximating a triangle mesh while controlling the complexity and orientation of the generated quad faces lies within the scope of the embodiments. In particular, a typical quad mesh generation algorithm optimizes a parametric mapping of a triangle mesh to a quad mesh to maximize the quality of the quad mesh while constraining the number of quad faces and the deviation from the triangle mesh. However, the manner in which the orientation of the quad faces can be constrained often varies based on the specific quad mesh generation algorithm and the techniques described herein may be modified accordingly.

As a general matter, in alternate embodiments, any number and type of quad mesh generation algorithms may be configured in any technically feasible fashion to simplify and/or control orientations of shapes in the resulting simplified quad mesh 164. In particular, any amount and type of "shape constraints" that control the orientation of quad faces generated by any type of quad mesh algorithm may be determined in any technically feasible fashion. Furthermore, in alternate embodiments, the functionality of the skeleton extraction engine 120, the simplification engine 130, the orientation propagation engine 140, and the constraint generation engine 150 may be modified to generate any number and type of shape constraints that are compatible with the implemented quad mesh generation algorithm(s).

For instance, in some embodiments, simple profiles may be generated for beam-like parts of the input triangle mesh 106, and a quad mesh generation algorithm may be constrained to use the profiles. In the same or other embodiments, an objective function associated with a quad meshing algorithm may be configured to penalize non-preferred orientations and/or the number of edges, vertices, and/or faces. In yet other alternate embodiments, the simplified T-spline 162 may be generated based on any number and type of simplified profiles and any number (including zero) and types of skeletons in any technically feasible fashion.

As shown, the creasing engine 170 generates a stylized T-spline 172 based on the simplified T-spline 162, the simplified quad mesh 164, and a creasing angle threshold 168. The creasing angle threshold 168 is also referred to herein as a "creasing threshold." For each edge of the simplified quad mesh 164, the creasing engine 170 determines the "edge" angle between the two quads that meet at the edge. If the edge angle exceeds the creasing angle threshold 168 (e.g., 80 degrees), then the creasing engine 170 applies a crease to the corresponding edge of the simplified T-spline 162. Otherwise, the creasing engine 170 does not apply a crease to the corresponding edge of the simplified T-spline 162.

In this fashion, the creasing engine 170 does not crease relative smooth edge angles but creases edge angles that are closer to a right angle. After the creasing engine 170 finishes applying the creases to the simplified T-spline 162, the creasing engine 170 stores the creased simplified T-spline 162 as the stylized T-spline 172. Advantageously, selectively adding creases to the simplified T-spline 162 can improve both the manufacturability and the aesthetics of the stylized design represented by the stylized T-spline 172 relative to both the simplified design represented by the simplified T-spline 162 and the input design represented by the input triangle mesh 106.

In alternate embodiments, the creasing engine 170 may perform any number of crease operations on the simplified T-spline 162 to generate the stylized T-spline 172 based on any relevant criteria and in any technically feasible fashion. For instance, in some embodiments, the creasing engine 170 may determine which edges to crease based on the simplified T-spline 162 instead of the simplified quad mesh 164. Further, the creasing engine 170 may determine which edges to crease based on the simplified T-spline 162 before fitting with the input triangle mesh 106, after fitting with the input triangle mesh 106, or without fitting with the input triangle mesh 106. In alternate embodiments, the creasing engine 170 may implement any type of rule, heuristic, algorithm, or trained machine learning model to determine which edges to crease.

After the creasing engine 170 generates the stylized T-spline 172, the stylization subsystem 102 provides the stylized T-spline 172 to any number and type of software applications. Each of the software applications may perform any number of design, optimization, and/or manufacturing operations based on the stylized T-spline 172 and/or the stylized design represented by the stylized T-spline 172.

As depicted with dashed boxes and arrows, in alternate embodiments, the stylization subsystem 102 may optionally include the T-spline optimization engine 180 and/or the B-Rep generation engine 190. The T-spline optimization engine 180 performs constrained optimization (i.e., fitting) of the stylized T-spline 172 to generate an optimized T-spline 182. More precisely, the T-spline optimization engine 180 optimizes the positions of the vertices in the stylized T-spline 172 (i.e., the control points) based on any number and type of constraints and/or objectives associated with a preferred style and/or any number of additional requirements (e.g., performance requirements) specified by a user.

For example, a "bottom flattening" constraint could specify that all the vertices in the bottom faces are required to have the same height. Similarly, a "top flattening" constraint could specify that all the vertices in the top faces are required to have the same height. In some embodiments, a "prismatic style" configuration includes a top/bottom flattening constraint, objectives such as volume minimization, and other constraints such as a mechanical stress constraint. The prismatic style configuration may be used to configure the T-spline optimization engine 180 to generate the optimized T-spline 182 representing a prismatic styled design that is relatively easy to manufacture using a particular type of CNC machining method.

The B-Rep generation engine 190 optionally converts the stylized T-spline 172 or the optimized T-spline 182 to a stylized B-Rep 192. In general, the stylized design represented by the stylized T-spline 172 may be converted to any number and type of different representations in any technically feasible fashion.

Figure 2:
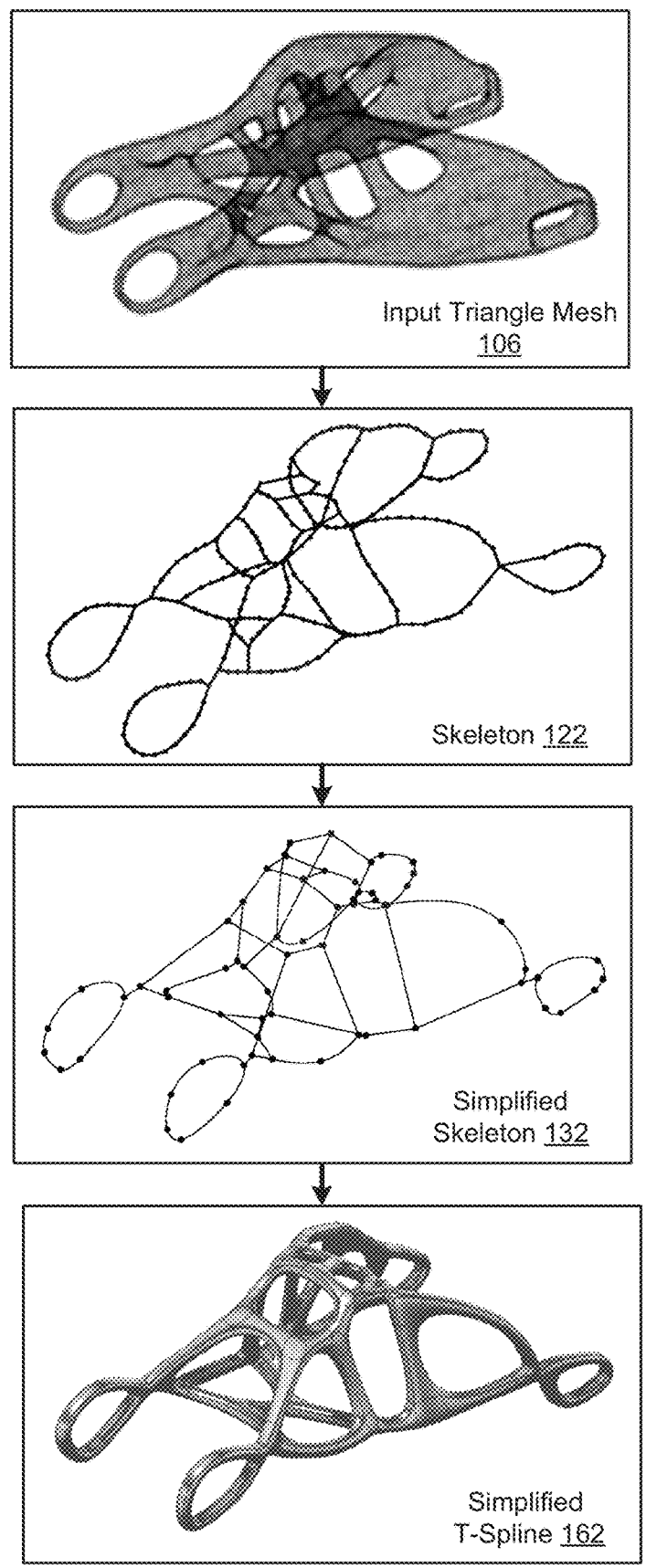
FIG. 2 shows exemplary illustrations of some of the intermediate outputs generated by the stylization subsystem of FIG. 1, according to various embodiments.

FIG. 2 shows exemplary illustrations of some of the intermediate outputs generated by the stylization subsystem 102 of FIG. 1, according to various embodiments. For explanatory purposes, the exemplary input design represented by the input triangle mesh 106 includes organic shapes. As described previously herein, to reproduces the lumps that characterize an organic shape, a CNC milling machine would have to move along many very long tool paths involving many time-consuming grinding operations.

The skeleton extraction engine 120 generates the skeleton 122 based on the input triangle mesh 106. Notably, the skeleton 122 accurately represents the global shape and topology of the input triangle mesh 106. Subsequently, the simplification engine 130 simplifies the skeleton 122 to generate the simplified skeleton 132. As illustrated, the simplified skeleton 132 accurately represents the global shape and topology of the triangle mesh 106, but the number of nodes and the number of edges in the simplified skeleton 132 are less than, respectively, the number of nodes and the number of edges in the skeleton 122.

As described previously in conjunction with FIG. 1, the orientation propagation engine 140 generates the orientation set 142 that the constraint generation engine 150 uses to generate the feature curve set 154. The feature curve set 154 and the mesh complexity constraint 158 configure the quad mesh generation engine 160 to generate the simplified T-spline 162 representing a simplified design that is simpler and smoother than input design represented by the input triangle mesh 106. Consequently, the time required for a CNC milling machine to manufacture an object based on the simplified design represented by the simplified T-spline 162 would be less than the time required for the CNC milling machine to manufacture an object based on the design represented by the input triangle mesh 106. Although not shown in FIG. 2, the creasing engine 170 subsequently creases some of the edges in the simplified T-spline 162 to generate the stylized T-spline 172.

Propagating Preferred Orientations(s) of Quad Faces

Figure 3:
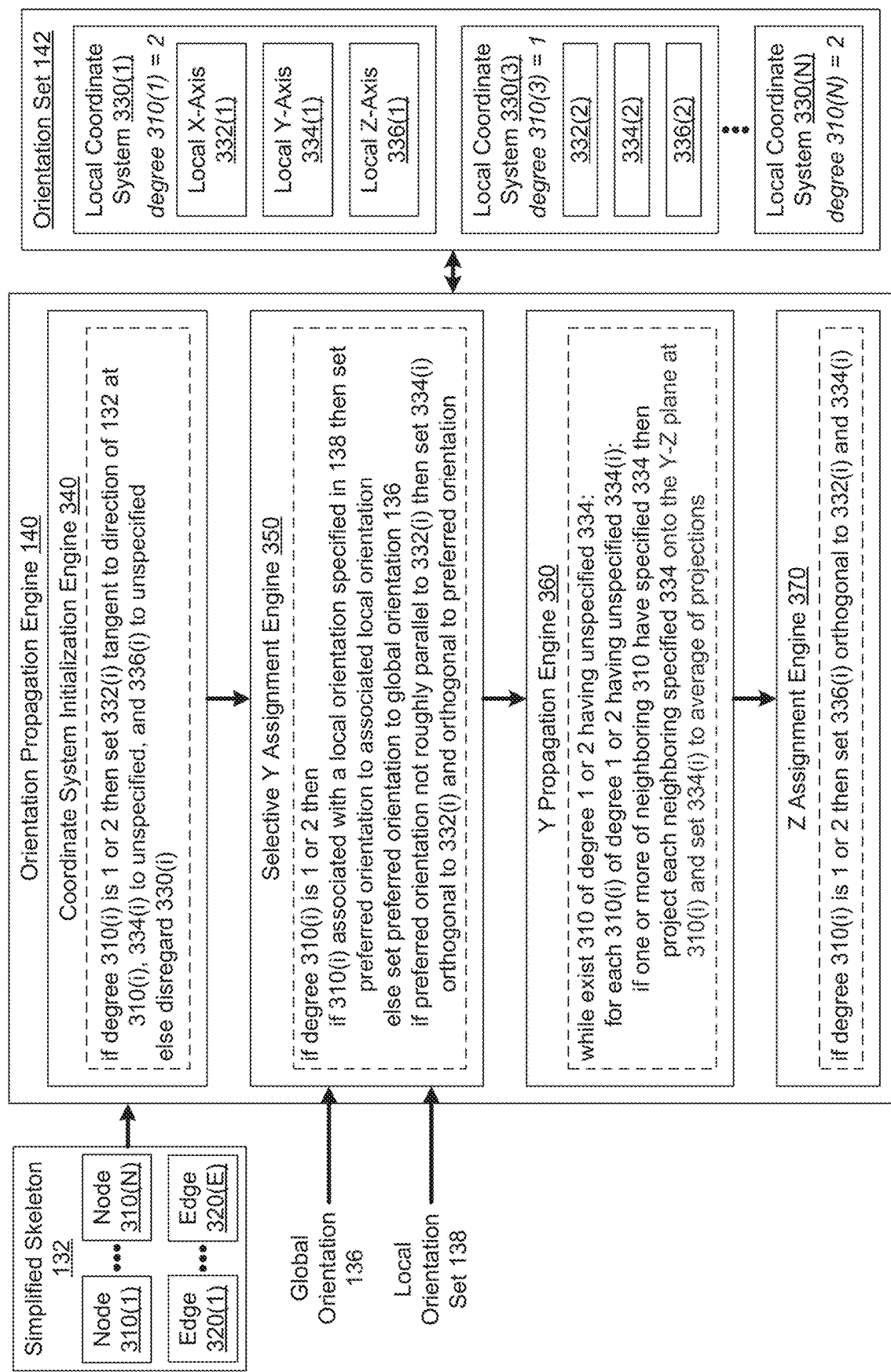
FIG. 3 is a more detailed illustration of the orientation propagation engine of FIG. 1, according to various embodiments.

FIG. 3 is a more detailed illustration of the orientation propagation engine 140 of FIG. 1, according to various embodiments. As shown, the orientation propagation engine 140 generates the orientation set 142 based on the simplified skeleton 132, the global orientation 136, and the local orientation set 138. The simplified skeleton 132 includes, without limitation, nodes 310(1)-310(N) and edges 320(1)-320(E), where N and E are any positive integers. Each of the edges 320 connects two of the nodes 310. The orientation propagation engine 140 includes, without limitation, a coordinate system initialization engine 340, a selective Y assignment engine 350, a Y propagation engine 360, and a Z assignment engine 370.

For each node 310(i) having a degree of one or two, the coordinate system initialization engine 340 generates and initializes a local coordinate system 330(i) and then adds the local coordinate system 330(i) to the orientation set 142. As shown, the local coordinate system 330(*i*) includes, without limitation, a local X-axis 332(*i*), a local Y-axis 334(*i*), and a local Z-axis 336(*i*). To initialize the local coordinate system 330(*i*), the coordinate system initialization engine 340 specifies a direction for the local X-axis 332(*i*) that is tangent to the direction of the simplified skeleton 132 at the node 310(*i*), sets the local Y-axis 334(*i*) to unspecified, and sets the local Z-axis 336(*i*) to unspecified. The coordinate system initialization engine 340 disregards the nodes 310 that do not have degrees of one or two.

Accordingly, the orientation set 142 includes, without limitation, a different local coordinate system 330 for each of the nodes 310 having a degree of one or two. For explanatory purposes only, the local coordinate system 330(*i*) corresponds to the node 310(*i*). For explanatory purposes only, the node 310(1) has a degree of two and, consequently, the orientation set 142 includes the local coordinate system 330(1). Similarly, the nodes 310(3) and 310(N) have, respectively, a degree of one and a degree of two. Consequently, the orientation set 142 includes the local coordinate systems 330(3) and 330(N). By contrast, the node 310(2) has a degree of three and the orientation set 142 does not include a corresponding local coordinate system 330.

The selective Y assignment engine 350 specifies directions for any number of the local Y-axes 334(*i*) based on the global orientation 136, and the local orientation set 138. For each node 310(*i*) having a degree of one or two, the selective Y assignment engine 350 determines whether the node 310(*i*) is associated with a local orientation specified in the local orientation set 138. If the node 310(*i*) is associated with a local orientation, then the selective Y assignment engine 350 selects the local orientation as a preferred orientation for the node 310(*i*). Otherwise, the Y assignment engine 350 selects the global orientation 136 as the preferred orientation for the node 310(*i*). If the preferred orientation is not approximately parallel to the local X-axis 332(*i*), then the Y assignment engine 350 specifies a direction for the local Y-axis 334(*i*) that is orthogonal to the local X-axis 332(*i*) and orthogonal to the preferred orientation at the node 310(*i*). Otherwise, the Y assignment engine 350 leaves the local Y-axis 334(*i*) unspecified.

The Y propagation engine 360 propagates the local Y-axes 334 that are specified to determine directions for the local Y-axes 334 that are unspecified. In some embodiments, the Y propagation engine 360 iteratively executes the following algorithm until the local Y-axes 334 for all the nodes 310 having a degree of one or two are specified. For each node 310(*i*) having a degree of one or two and an unspecified local Y-axis 334(*i*), the Y propagation engine 360 determines whether at least one of the two neighboring nodes 310 has a specified local Y-axis 334. If neither of the neighboring nodes 310 has s specified local Y-axis 334, then the Y propagation engine 360 does not assign a direction to the local Y-axis 334(*i*) during the current iteration.

Otherwise, for each neighboring node 310(*j*) having a specified local Y-axis 334(*j*), the Y propagation engine 360 projects the local Y-axis 334(*j*) onto the Y-Z plane at the node 310(*i*) to determine an associated projected direction. If only one of the neighboring nodes 310 has a specified local Y-axis 334, then the Y propagation engine 360 sets the local Y-axis 334(*i*) to the projected direction. Otherwise, the Y propagation engine 360 sets the local Y-axis 334(*i*) to the average of the projected directions.

Subsequently, for each node 310(*i*) that has a degree of one or two, the Z assignment engine 370 specifies a direction for the local Z-axis 336(*i*) that is orthogonal to the local X-axis 332(*i*) and orthogonal to the local Y-axis 334(*i*). In alternate embodiments, the orientation propagation engine 140 may determine the local coordinate systems 330 in any technically feasible fashion. For instance, in various embodiments and instead of implementing the propagation algorithm described previously herein, the Y propagation engine 360 may implement any label propagation algorithm in any technically feasible fashion to determine directions for the local Y-axes 334.

Figure 4:
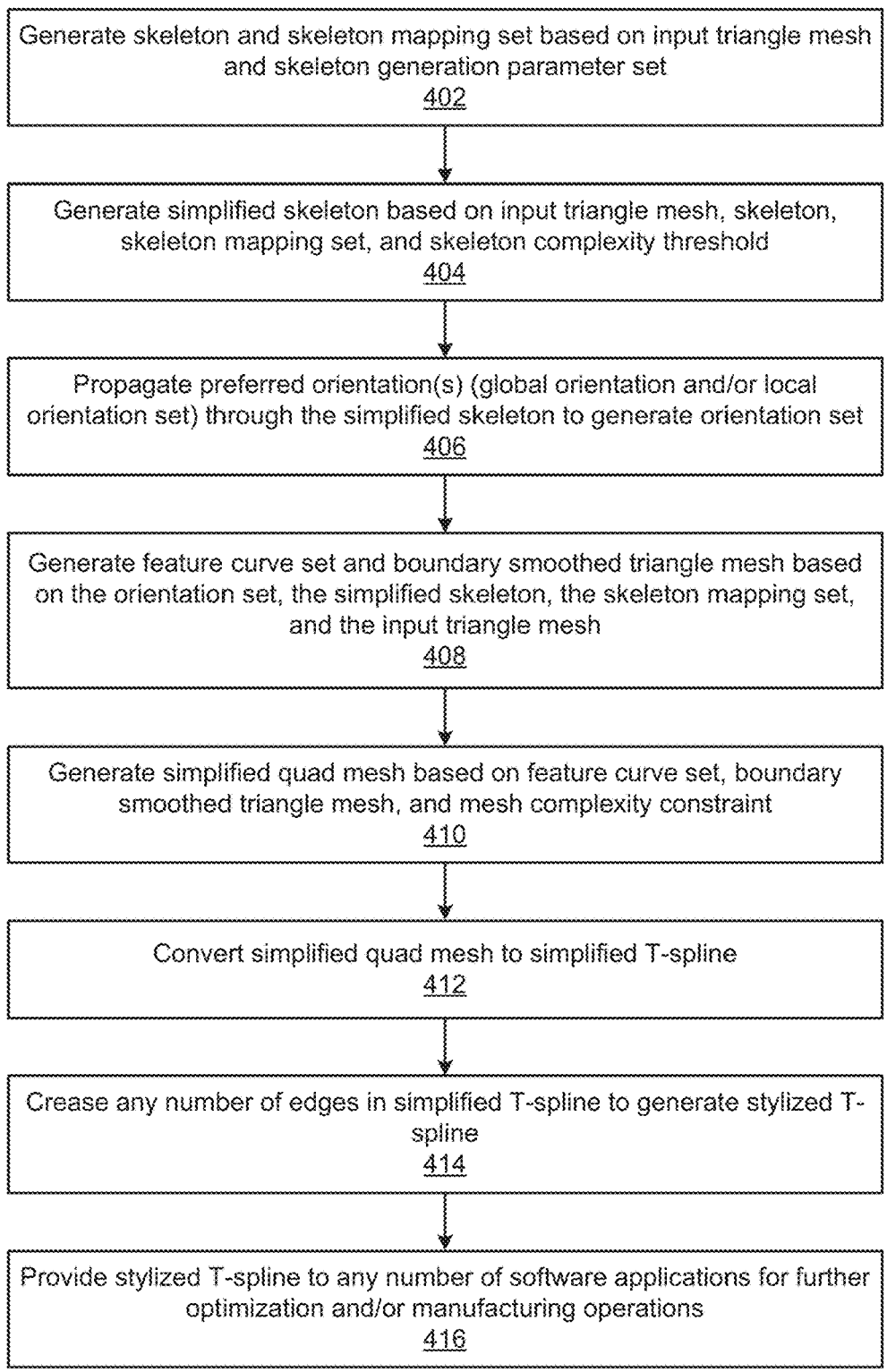
FIG. 4 is a flow diagram of method steps for automatically modifying a three-dimensional object design, according to various embodiments.

FIG. 4 is a flow diagram of method steps for automatically modifying a three dimensional object design according to various embodiments. Although the method steps are described with reference to the systems of FIGS. 1-3, persons skilled in the art will understand that any system configured to implement the method steps, in any order, falls within the scope of the various embodiments.

As shown, a method 400 begins at step 402, where the skeleton extraction engine 120 generates the skeleton 122 and the skeleton mapping set 124 based on the input triangle mesh 106. The input triangle mesh 106 represents a 3D object design. At step 404, the simplification engine 130 generates the simplified skeleton 132 based on the input triangle mesh 106, the skeleton 122, the skeleton mapping set 124, and the skeleton complexity threshold 128. At step 406, the orientation propagation engine 140 propagates the preferred orientation(s) (i.e., the global orientation 136 and/or the local orientations specified in the local orientation set 138) to each node of the simplified skeleton 132 having a degree of one or two to generate the orientation set 142. At step 408, the constraint generation engine 150 generates the feature curve set 154 and the boundary smoothed triangle mesh 152 based on the orientation set 142, the simplified skeleton 132, the skeleton mapping set 124, and the input triangle mesh 106.

At step 410, the quad mesh generation engine 160 generates the simplified quad mesh 164 based on the feature curve set 154, the boundary smoothed triangle mesh 152, and the mesh complexity constraint 158. At step 412, the quad mesh generation engine 160 converts the simplified quad mesh 164 to the simplified T-spline 162. At step 414, the creasing engine 170 creases any number of the edges in the simplified T-spline 162 based on the creasing angle threshold 168 to generate the stylized T-spline 172 that represents the stylized design. At step 416, the stylization subsystem 102 provides the stylized T-spline 172 to any number of software applications for further optimization and/or manufacturing operations. The method 400 then terminates.

In sum, the disclosed techniques may be used to efficiently modify designs to reflect non-functional preferences. In one embodiment, a stylization subsystem converts an input triangle mesh representing a 3D object design to a stylized T-spline representing a stylized 3D object design based on a mesh complexity constraint, one or more preferred orientations, and a creasing angle threshold. The stylization subsystem includes, without limitation, a skeleton extraction engine, a simplification engine, an orientation propagation engine, a constraint generation engine, a quad mesh generation engine, and a creasing engine. The skeleton extraction engine generates a skeleton that represents the global shape and topology of the input triangle mesh. The skeleton extraction engine also generates a skeleton mapping set that, for each node and each edge in the skeleton, specifies a mapping to one or more vertices in the input triangle mesh. The simplification engine segments the edges in the skeleton, determines redundant nodes/edges based on a skeleton complexity parameter, and removes the redundant nodes/edges to generate a simplified skeleton.

The orientation propagation engine 140 determines a local coordinate system for each node in the simplified skeleton having degree one or two based on a global orientation and/or a local orientation set that specifies local orientations for any number of nodes.

The constraint generation engine generates a feature curve set and an underlying boundary smoothed triangle mesh based on the local coordinate systems associated with the simplified skeleton, the skeleton mapping set, and the input triangle mesh. The quad mesh generation engine generates a simplified quad mesh having the same topology as and approximating the boundary smoothed triangle mesh while limiting the complexity of the simplified quad mesh and controlling the orientation of the generated quad faces based on the feature curve set. Subsequently, the quad mesh generation engine converts the simplified quad mesh to a simplified T-spline. The creasing engine creases any number of the edges in the simplified T-spline based on a creasing angle threshold to generate a stylized T-spline. Finally, the stylization subsystem provides the stylized T-spline to any number of software applications for further optimization, design, format conversion, or manufacturing operations.

At least one technical advantage of the disclosed techniques relative to the prior art is that the stylization subsystem can more efficiently modify a design of a 3D object to improve overall aesthetics and manufacturability. In particular, the stylization subsystem automatically performs simplification, orientation, and creasing operations that can modify the types of surfaces and edges in an design that includes organic shapes to produce a stylized design that has fewer lumpy shapes and faces that are better aligned with preferred orientation(s). Accordingly, the time and effort required to improve the aesthetics and manufacturability of a given 3D object design can be substantially reduced relative to more manual prior art approaches. Further, because the stylization subsystem can automatically modify 3D object designs, a greater number of modifications to 3D object designs can be made within allotted budgets for design activities, thereby increasing the overall aesthetic quality and manufacturability of those designs. These technical advantages provide one or more technological advancements over prior art approaches.

Clause 1. In some embodiments, a computer-implemented method for automatically modifying a three-dimensional (3D) object design comprises generating a simplified quad mesh based on an input triangle mesh that represents the 3D object design, a preferred orientation associated with at least a portion of the input triangle mesh, and at least one mesh complexity constraint; performing one or more operations to convert the simplified quad mesh to a simplified T-spline; and performing one or more operations to crease one or more edges included in the simplified T-spline to generate a stylized T-spline, wherein the stylized T-spline represents a stylized design that is more convergent with the preferred orientation than the 3D object design.

Clause 2. The computer-implemented method of clause 1, wherein the preferred orientation is associated with at least one of a machining process, an aesthetic preference, and a style.

Clause 3. The computer-implemented method of clauses 1 or 2, wherein the input triangle mesh is generated using at least one of a generative design algorithm and a topology optimization algorithm.

Clause 4. The computer-implemented method of any of clauses 1-3, wherein generating the simplified quad mesh comprise generating one or more shape constraints based on the input triangle mesh and the preferred orientation; and executing a quad mesh generation algorithm based on the input triangle mesh, the one or more shape constraints, and the at least one mesh complexity constraint.

Clause 5. The computer-implemented method of any of clauses 1-4, wherein generating the simplified quad mesh comprises configuring an objective function based on the preferred orientation; and executing a quad mesh generation algorithm based on the input triangle mesh, the objective function, and the at least one mesh complexity constraint.

Clause 6. The computer-implemented method of any of clauses 1-5, wherein generating the simplified quad mesh comprises generating a simplified skeleton based on the input triangle mesh; generating one or more shape constraints based on the simplified skeleton and the preferred orientation; and executing a quad mesh generation algorithm based on the input triangle mesh, the one or more shape constraints, and the at least one mesh complexity constraint.

Clause 7. The computer-implemented method of any of clauses 1-6, wherein generating the simplified quad mesh comprises generating one or more feature curves based on the input triangle mesh and the preferred orientation, wherein each feature curve comprises a series of triangle edges; and executing a quad mesh generation algorithm based on the input triangle mesh, the one or more feature curves, and the at least one mesh complexity constraint.

Clause 8. The computer-implemented method of any of clauses 1-7, wherein performing the one or more operations to convert the simplified quad mesh comprises generating an initial T-spline based on the simplified quad mesh; and fitting the initial T-spline with the input triangle mesh to generate the simplified T-spline.

Clause 9. The computer-implemented method of any of clauses 1-8, wherein performing the one or operations to crease one or more edges comprises determining one or more edges included in the simplified T-spline that should be creased based on at least one of a rule, a heuristic, an algorithm, and a trained machine learning model; and for each edge included in the one or more edges, performing one or more crease operations on the edge.

Clause 10. The computer-implemented method of any of clauses 1-9, wherein performing the one or more operations to crease one or more edges comprises determining that a first angle associated with a first edge between two quads included in the simplified quad mesh exceeds a creasing threshold; determining that a second edge included in the simplified T-spline corresponds to the first edge; and performing one or more crease operations on the second edge;

Clause 11. In some embodiments, one or more non-transitory computer readable media include instructions that, when executed by one or more processors, cause the one or more processors to automatically modify a three-dimensional (3D) object design by performing the steps of generating one or more shape constraints based on an input triangle mesh that represents the 3D object design and a preferred orientation associated with at least a portion of the input triangle mesh; generating a simplified T-spline based on the input triangle mesh, the one or more shape constraints, at least one mesh complexity constraint, and a quad generation algorithm; and performing one or more operations to crease one or more edges included in the simplified T-spline to generate a stylized T-spline, wherein the stylized T-spline represents a stylized design that is more convergent with the preferred orientation than the 3D object design.

Clause 12. The one or more non-transitory computer readable media of clause 11, wherein the preferred orientation is associated with a pooling direction that part of a molding manufacturing process or a machining direction that is part of a three-axis subtractive manufacturing process.

Clause 13. The one or more non-transitory computer readable media of clauses 11 or 12, wherein the 3D object design includes a least one organic shape.

Clause 14. The one or more non-transitory computer readable media of any of clauses 11-13, wherein generating the one or more shape constraints comprises generating a simplified skeleton based on the input triangle mesh; and determining the one or more shape constraints based on the simplified skeleton and the preferred orientation.

Clause 15. The one or more non-transitory computer readable media of any of clauses 11-14, wherein the one or more shape constraints comprise one or more feature curves and each feature curve comprises a series of triangle edges.

Clause 16. The one or more non-transitory computer readable media of any of clauses 11-15, wherein generating the simplified T-spline comprises executing the quad mesh generation algorithm based on the input triangle mesh, the one or more shape constraints, and the at least one mesh complexity constraint to generate a simplified quad mesh; and performing one or more operations to convert the simplified quad mesh to the simplified T-spline.

Clause 17. The one or more non-transitory computer readable media of any of clauses 11-16, wherein generating the simplified T-spline comprises executing the quad mesh generation algorithm based on the input triangle mesh, the one or more shape constraints, and the at least one mesh complexity constraint to generate a simplified quad mesh; performing one or more operations to convert the simplified quad mesh to an initial T-spline; and fitting the initial T-spline with the input triangle mesh to generate the simplified T-spline.

Clause 18. The one or more non-transitory computer readable media of any of clauses 11-17, wherein performing the one or operations to crease one or more edges comprises determining one or more edges included in the simplified T-spline that should be creased based on at least one of a rule, a heuristic, an algorithm, and a trained machine learning model; and for each edge included in the one or more edges, performing one or more crease operations on the edge.

Clause 19. The one or more non-transitory computer readable media of any of clauses 11-18, wherein performing the one or more operations to crease one or more edges comprises determining that a first angle associated with a first edge included in the simplified T-spline exceeds a creasing threshold; and performing one or more crease operation on the first edge.

Clause 20. In some embodiments, a system for automatically modifying a three-dimensional (3D) object design comprises one or more memories storing instructions; and one or more processors that are coupled to the one or more memories and, when executing the instructions, are configured to generate a simplified quad mesh based on an input triangle mesh that represents the 3D object design, a preferred orientation associated with at least a portion of the input triangle mesh, and at least one mesh complexity constraint; perform one or more operations to convert the simplified quad mesh to a simplified T-spline; and perform one or more operations to crease one or more edges included in the simplified T-spline to generate a stylized T-spline, wherein the stylized T-spline represents a stylized design that is more convergent with the preferred orientation than the 3D object design.

Any and all combinations of any of the claim elements recited in any of the claims and/or any elements described in this application, in any fashion, fall within the contemplated scope of the present embodiments and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module," a "system," or a "computer." In addition, any hardware and/or software technique, process, function, component, engine, module, or system described in the present disclosure may be implemented as a circuit or set of circuits. Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for automatically modifying a three-dimensional (3D) object design, the method comprising:
   generating a simplified quad mesh based on an input triangle mesh that represents the 3D object design, a preferred orientation associated with at least a portion of the input triangle mesh, and at least one mesh complexity constraint;
   performing one or more operations to convert the simplified quad mesh to a simplified T-spline; and
   performing one or more operations to crease one or more edge angles associated with one or more edges included in the simplified T-spline to generate a stylized T-spline, wherein the stylized T-spline represents a stylized design that is more aligned with a 3D vector than the 3D object design, and wherein the 3D vector specifies the preferred orientation.

2. The computer-implemented method of claim 1, wherein the preferred orientation is associated with at least one of a machining process, an aesthetic preference, and a style.

3. The computer-implemented method of claim 1, wherein the input triangle mesh is generated using at least one of a generative design algorithm and a topology optimization algorithm.

4. The computer-implemented method of claim 1, wherein generating the simplified quad mesh further comprises:
   generating one or more shape constraints based on the input triangle mesh and the preferred orientation; and
   executing a quad mesh generation algorithm based on the input triangle mesh, the one or more shape constraints, and the at least one mesh complexity constraint.

5. The computer-implemented method of claim 1, wherein generating the simplified quad mesh further comprises:
   configuring an objective function based on the preferred orientation; and
   executing a quad mesh generation algorithm based on the input triangle mesh, the objective function, and the at least one mesh complexity constraint.

6. The computer-implemented method of claim 1, wherein generating the simplified quad mesh further comprises:
   generating a simplified skeleton based on the input triangle mesh;
   generating one or more shape constraints based on the simplified skeleton and the preferred orientation; and
   executing a quad mesh generation algorithm based on the input triangle mesh, the one or more shape constraints, and the at least one mesh complexity constraint.

7. The computer-implemented method of claim 1, wherein generating the simplified quad mesh further comprises:
   generating one or more feature curves based on the input triangle mesh and the preferred orientation, wherein each feature curve comprises a series of triangle edges; and
   executing a quad mesh generation algorithm based on the input triangle mesh, the one or more feature curves, and the at least one mesh complexity constraint.

8. The computer-implemented method of claim 1, wherein performing the one or more operations to convert the simplified quad mesh comprises:
   generating an initial T-spline based on the simplified quad mesh; and
   fitting the initial T-spline with the input triangle mesh to generate the simplified T-spline.

9. The computer-implemented method of claim 1, wherein performing the one or more operations to crease the one or more edge angles associated with the one or more edges comprises:
   determining one or more edges included in the simplified T-spline that should be creased based on at least one of a rule, a heuristic, an algorithm, and a trained machine learning model; and
   for each edge included in the one or more edges, performing one or more crease operations on an edge angle associated with the edge.

10. The computer-implemented method of claim 1, wherein performing the one or more operations to crease the one or more edge angles associated with the one or more edges comprises:
    determining that a first angle associated with a first edge between two quads included in the simplified quad mesh exceeds a creasing threshold;
    determining that a second edge included in the simplified T-spline corresponds to the first edge; and
    performing one or more crease operations on an edge angle associated with the second edge.

11. One or more non-transitory computer readable media including instructions that, when executed by one or more processors, cause the one or more processors to automatically modify a three-dimensional (3D) object design by performing the steps of:
    generating one or more shape constraints based on an input triangle mesh that represents the 3D object design and a preferred orientation associated with at least a portion of the input triangle mesh;
    generating a simplified T-spline based on the input triangle mesh, the one or more shape constraints, at least one mesh complexity constraint, and a quad generation algorithm; and
    performing one or more operations to crease one or more edge angles associated with one or more edges included in the simplified T-spline to generate a stylized T-spline, wherein the stylized T-spline represents a stylized design that is more convergent with a 3D vector that specifies the preferred orientation relative to the 3D object design.

12. The one or more non-transitory computer readable media of claim 11, wherein the preferred orientation is associated with a pooling direction that part of a molding manufacturing process or a machining direction that is part of a three-axis subtractive manufacturing process.

13. The one or more non-transitory computer readable media of claim 11, wherein the 3D object design includes a least one organic shape.

14. The one or more non-transitory computer readable media of claim 11, wherein generating the one or more shape constraints comprises:
   generating a simplified skeleton based on the input triangle mesh; and
   determining the one or more shape constraints based on the simplified skeleton and the preferred orientation.

15. The one or more non-transitory computer readable media of claim 11, wherein the one or more shape constraints comprise one or more feature curves and each feature curve comprises a series of triangle edges.

16. The one or more non-transitory computer readable media of claim 11, wherein generating the simplified T-spline comprises:
   executing a quad mesh generation algorithm based on the input triangle mesh, the one or more shape constraints, and the at least one mesh complexity constraint to generate a simplified quad mesh; and
   performing one or more operations to convert the simplified quad mesh to the simplified T-spline.

17. The one or more non-transitory computer readable media of claim 11, wherein generating the simplified T-spline comprises:
   executing a quad mesh generation algorithm based on the input triangle mesh, the one or more shape constraints, and the at least one mesh complexity constraint to generate a simplified quad mesh;
   performing one or more operations to convert the simplified quad mesh to an initial T-spline; and
   fitting the initial T-spline with the input triangle mesh to generate the simplified T-spline.

18. The one or more non-transitory computer readable media of claim 11, wherein performing the one or more operations to crease the one or more edge angles associated with the one or more edges comprises:
   determining one or more edges included in the simplified T-spline that should be creased based on at least one of a rule, a heuristic, an algorithm, and a trained machine learning model; and
   for each edge included in the one or more edges, performing one or more crease operations on an edge angle associated with the edge.

19. The one or more non-transitory computer readable media of claim 11, wherein performing the one or more operations to crease the one or more edge angles associated with the one or more edges comprises:
   determining that a first angle associated with a first edge included in the simplified T-spline exceeds a creasing threshold; and
   performing one or more crease operations on an edge angle associated with the first edge.

20. A system for automatically modifying a three-dimensional (3D) object design, the system comprising:
   one or more memories storing instructions; and
   one or more processors that are coupled to the one or more memories and, when executing the instructions, are configured to:
      generate a simplified quad mesh based on an input triangle mesh that represents the 3D object design, a preferred orientation associated with at least a portion of the input triangle mesh, and at least one mesh complexity constraint;
      perform one or more operations to convert the simplified quad mesh to a simplified T-spline; and
      perform one or more operations to crease one or more edge angles associated with one or more edges included in the simplified T-spline to generate a stylized T-spline, wherein the stylized T-spline represents a stylized design that is more convergent with a 3D vector that specifies the preferred orientation relative to the 3D object design.

* * * * *